(12) United States Patent
Seshadri

(10) Patent No.: US 11,327,638 B2
(45) Date of Patent: May 10, 2022

(54) METHOD FOR CREATING USER CONFIGURABLE ACTIVE STOREFRONTS AND ACTIVE PERSONAL PROFILES

(71) Applicant: Prasad Narasimha Seshadri, Las Vegas, NV (US)

(72) Inventor: Prasad Narasimha Seshadri, Las Vegas, NV (US)

( * ) Notice: Subject to any disclaimer, the term of this patent is extended or adjusted under 35 U.S.C. 154(b) by 181 days.

(21) Appl. No.: 16/398,249

(22) Filed: Apr. 29, 2019

(65) Prior Publication Data
US 2019/0346995 A1   Nov. 14, 2019

Related U.S. Application Data

(60) Provisional application No. 62/669,893, filed on May 10, 2018.

(51) Int. Cl.
| | |
|---|---|
| *G06F 3/048* | (2013.01) |
| *G06F 3/04845* | (2022.01) |
| *G06F 3/0485* | (2022.01) |
| *G06F 16/438* | (2019.01) |
| *G06Q 50/00* | (2012.01) |
| *G06F 16/955* | (2019.01) |
| *G06T 11/60* | (2006.01) |

(52) U.S. Cl.
CPC ........ *G06F 3/04845* (2013.01); *G06F 3/0485* (2013.01); *G06F 16/4387* (2019.01); *G06F 16/9558* (2019.01); *G06Q 50/01* (2013.01); *G06T 11/60* (2013.01)

(58) Field of Classification Search
None
See application file for complete search history.

(56) References Cited

U.S. PATENT DOCUMENTS

| | | | |
|---|---|---|---|
| 2002/0010617 A1* | 1/2002 | Hamaguchi | G06Q 30/0601 705/14.56 |
| 2008/0303811 A1* | 12/2008 | Van Luchene | A63F 13/85 345/419 |
| 2013/0047098 A1* | 2/2013 | Shuster | G06F 3/0487 715/757 |
| 2016/0055544 A1* | 2/2016 | Fedyaev | G06Q 30/0277 705/14.73 |
| 2018/0214777 A1* | 8/2018 | Hingorani | A63F 13/46 |

* cited by examiner

*Primary Examiner* — William C Trapanese

(57) ABSTRACT

Currently there is no product that allows an attractive graphical home or building-like virtual presence on the Internet to be created—that would allow all the typical interactions or information dissemination that one would like to have with individuals or businesses reflecting their actual presence in a geographical location. Having such a product allows virtual neighborhoods to be created both by geographical location or by interests or by nature of businesses or many other such classifications. Enabling active interaction with businesses through the graphical presence will be useful in both increasing the footfall for the businesses as well as reducing the cost of their backend operational expenses by automating the interactions with their customers.

1 Claim, 3 Drawing Sheets

METHOD FOR CREATING USER CONFIGURABLE ACTIVE STOREFRONTS AND ACTIVE PERSONAL PROFILES

BACKGROUND

Field of the Invention

Profiles of individuals as well businesses on social media sites like Facebook and Twitter and others have a major lacuna. They do not reflect a desirable home-like or business-like visual presence that makes an impressive visual statement about the business or individual. Making them transaction level active—capable of interaction with those who land on the profiles adds a considerable value to the profiles. This lead to an effective and interesting way to interact with people and businesses in one's neighborhood.

We would like an individual to create a graphic representation of his/her profile that appears as an actual home built to the individual's own taste tied to either his postal zone. We would like a business like a restaurant to be able to create a graphic representation of an actual restaurant to the restaurant built to owner's taste tied to its actual address, postal zone, and the type of cuisine it offers. This capability is extended to many other types of business like physicians' offices, beauty parlors, automobile service businesses, ethnic grocers etc.—all small to medium businesses who would benefit from being able to interact online with individuals in the geographical vicinity thereby increasing their footfall and turnover as well as providing them with analytical information about their clientele who would interact through such a portal. These graphic representations would create a virtual community that can be linked with mapping software for customers to zoom into or zoom out of like they do with mapping software to be able to gage direction and distances. This would extend all over the world.

Having created such graphic presence, one gets an opportunity to create additional value to these graphic representations by making these representations ACTIVE—that is, for individuals to interact with other individuals and businesses in a meaning and value-added manner. For example, the graphic representation of a restaurant will have the capability of individuals landing on a restaurant to actually see its menu, ask questions through a chat box as one would with a waiter if one were physically seated in the restaurant, choose items on the menu, with remarks as to how they want the item to be done, quantities and whether the items are ordered for dine in, take out, delivery or for shipping and payment for the entire item can be made on-line through our portal yielding a percentage of the order to the portal service provider. There would be additional options for reviewing the food ordered. The review would be far more in-depth in this case, since the review can even be on an item-by-item basis should the reviewer choose to do so. The restaurant can also publicize its special offers or coupons and automatically direct it to all the individuals residing in specific geographical areas to increase its footfall. This interaction scenario described for restaurants can be extended to the other types of business described. The graphic presence for doctors would enable the doctors to indicate availability of consultation slots and for users to take up their slots—for example. These examples indicate the huge value added to both individuals as well as businesses. Those who are travelling can temporarily change their address and be able to interact with all the businesses in their new temporary geographical location. Individuals similarly could find other individuals in their geographical vicinity with similar interests by either by doing a search by interests and postal zone and then leaving a message in the mailbox of individuals with whom there might be the possibility of mutual interest.

SUMMARY

A viable platform and methodology to create a graphic representation of a home or business. Every building-like graphical presence will have architectural elements like windows, chimneys, columns, canopies, roofs, porticos etc. We can provide several selections of each of these architectural elements for the home owner or business owner to "construct" their graphic presence that is stylistically unique and to their taste.

This includes a methodology for making the graphic representation as interesting as possible to attract visitors to the site even before interacting. This includes several creative tools and ideas to make the presence as interesting as possible enabling every person and business to differentiate and render unique and interesting personality to their presence on the portal. This includes ability to add music or messages or video that landing individuals can listen to while they wait for personnel at the chat box or do so if they visit the presence after working hours or browse favorite movies or books or photographs or music if a friend lands on an individuals' presence. Videos and songs posted on social media sites are all scattered according to the date of posting. The portal will have the ability to consolidate all of them inside the graphic presence. Even a resume can be added to an individual's page that can be seen only by representatives of businesses for example. Personal interests like singing, instruments, games etc. can be captured at the time of registration and indicated in some way on the graphic building.

This describes several ways for landing individuals to interact with the owner of the presence—including chat box, mail box, wanted box, on offer box. This also included business specific tools like being able to enter menu items and their prices, being able to accept orders, enter instructions, calculate bills, tips, taxes, collect payments etc.

This describes analytical tools and backend reports that will be useful for both individuals and businesses to track earlier transactions and interactions and for businesses to be able to extract figures from sales via this portal to feed into their ERP.

This describes the ability to pin the portal presence created to one's social media profile in some manner so that the graphic presence becomes an enhancement to the profile page on all the major social media sites. Clicking on this image enables those landing on the social media profile to click on the pinned image or link and find their way into our portal thereby increasing the traffic.

Apps will be created for mobile devices so that the graphic representations will fit in neatly on all types of mobile devices on iOS, Android, and Windows platforms.

DETAILED DESCRIPTION

The term "server", when used here, is broadly understood to mean any computing entity or family of such entities capable of responding to user requests over a network. The computing entities may be computer servers or server farms, general purpose digital computers, personal digital assistants, special-purpose devices such as printers or scanners with digital processors built in, or specialized hardware devices such as XML chips or XML computers; either containing storage units or making use of storage units elsewhere on the network. The family of computing entities may be geographically distributed or may be "virtual" entities within a larger entity.

The term "video file," when used here, is broadly understood to mean a digital representation of a video signal. It can be lossy or lossless, and can include any suitable format, including CCIR 601, MPEG-1, MPEG-2, MPEG-4, H.261, H.263, H.264, any codec-based, MiniDV, Digital8, DVD, or other formats already existing or yet to be invented.

The term "audio file", when used here, is broadly understood to mean any digital representation of an audio waveform. It can be lossy or lossless, and can include WAV, PCM, TTA, FLAC, AU, MP3, Ogg Vorbis, Windows Media Audio, TTA, RIFF, AIFF, IFF, BWF, Advanced Audio Coding, FLV or other format already existing or yet to be invented.

The true gold standard for presence of an individual or a business on the Internet is a graphic representation of an individual's home reflecting the styles typical to the geographical area the individual lives in—an Adobe style home in Arizona or a Mediterranean style home in California for example and with the capability to fill it with several items of interest as one would with one's own business or home—like music or video that plays upon landing, a collection of favorite music, pictures, videos available for permitted landing visitors to view on demand all presented more elegantly than they are currently on social media sites.

Figure 1:
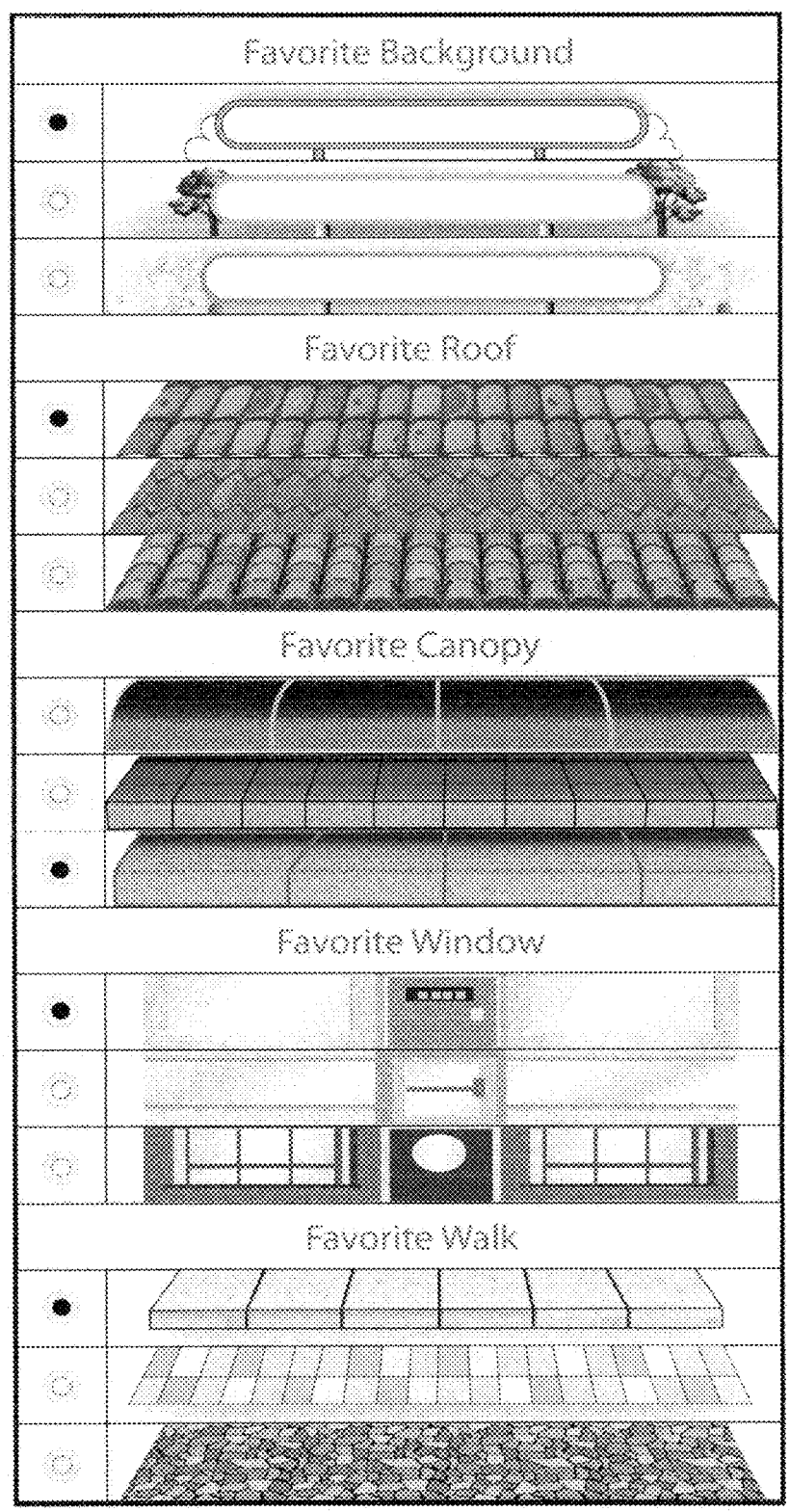
FIG. 1 illustrates how architectural elements are combined to create a graphic presence of an individual home or business.
Figure 2:
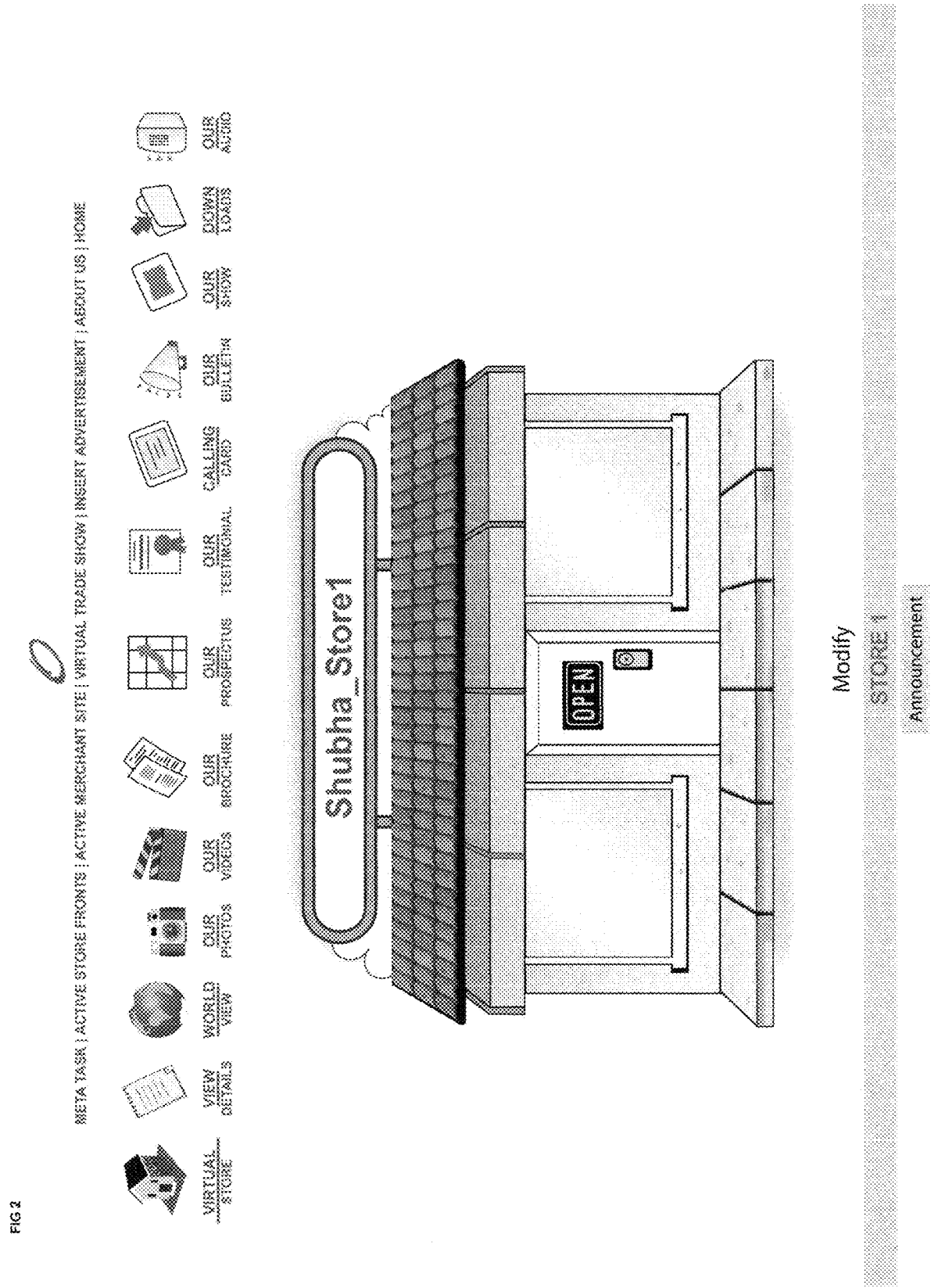
FIG. 2 illustrates the finished graphic presence.

Such graphic representations can be created by combining architectural elements as shown in FIG. 1 and FIG. 2. What is shown is by using Radio Buttons since these are simplest for the lay user who may not be very technology savvy. Broadly, the selection can be done by any other means that such selection is done using a computer like drag and drop, drop down menu, checkboxes, lists etc.

If 5 selections are available for a single architectural element and there are 6 architectural elements then one will be able to get $6^5$ unique styles=7,776 unique styles, which a decent amount of choice.

Next step to creating a graphic presence is to fill the presence with items of interest. Just as would encounter piped music when one enters a business premises or when one enters the home of a friend, we will be able to create a playlist by uploading audio files from a computer or by pasting links from websites like YouTube, Soundcloud or Smule. We can also create a playlist of videos by uploading videos from one's computer or links from video websites like YouTube, Vimeo, Dailymotion etc. On the graphic presence of individuals, there will be the ability to upload photographs or videos or audio from one's computer or paste links for these for visitors to play on demand. These can also be pulled from Social Media sites with permission from the user. All these are arranged in an attractive way so that they can be easily accesses by permitted visitors. Even animated pets with realistic sounds can be added to add human interest to a home. If music is playing on the landing site, animated notes can be seen flying out of the graphic representation. Personal interests entered at the time if registration can be displayed appropriately on the graphic buildings of individuals.

Standard communication tools like chat boxes will be provided. In addition, there is a 'What I Am Looking For' box one can enter any personal need. Example:Babysitter on Saturday evenings to be with my 7-year-old son for 4 hours. Standard needs are immediately visible through an icon that is instantly recognizable to passing visitors. Similarly, there is a 'What I Have To Offer' box where one can offer a service or an item for sale or to give away free. Similar boxes are made available for businesses as well. In the case of businesses, the corresponding boxes are 'What We Are Looking For' and 'What We Are Offering'. These could be positions to fill or discounts being offered.

Privacy options are provided for each element so that only permitted audience can see each of the features added. For example, there is no need for friends located in other cities to know that a person is looking for a babysitter. He can confine the visibility of this feature only to those who live in his/her postal zone or city.

Backend reporting tools enable interactions to be logged continuously. In the case of businesses, more sophisticated interaction tools like being able to send copies of chat interaction to the individual's registered email, to email receipts of financial transactions, for user to trace transactions one has had, to get annual summary of transactions of an individual automatically mailed to the individual upon request, for the business all the transactions are summarized in a standard form to feed into their ERP.

To virally market this concept there will have to be some tie up to existing profile pages on Facebook, Twitter etc. so that by clicking on an icon or link user's friends can fund away to the user's home to visit it. This will drive traffic to and interest in the portal.

Powerful search tools are developed to find homes businesses based on certain criteria. In addition. One can create a virtual community—example tennis players in the postal zone 95138 and browse these or Groceries selling Indian Groceries in Las Vegas.

The graphic buildings will be equally easy to view and interact with on desktop, laptops, and mobile devices, either through popular browsers or through apps designed for iOS, Android or Window based device.

The transport from building to building will be by means of a horizontal cursor or horizontal swipe in the case of touchscreen devices.

System Interactions

Figure 3:
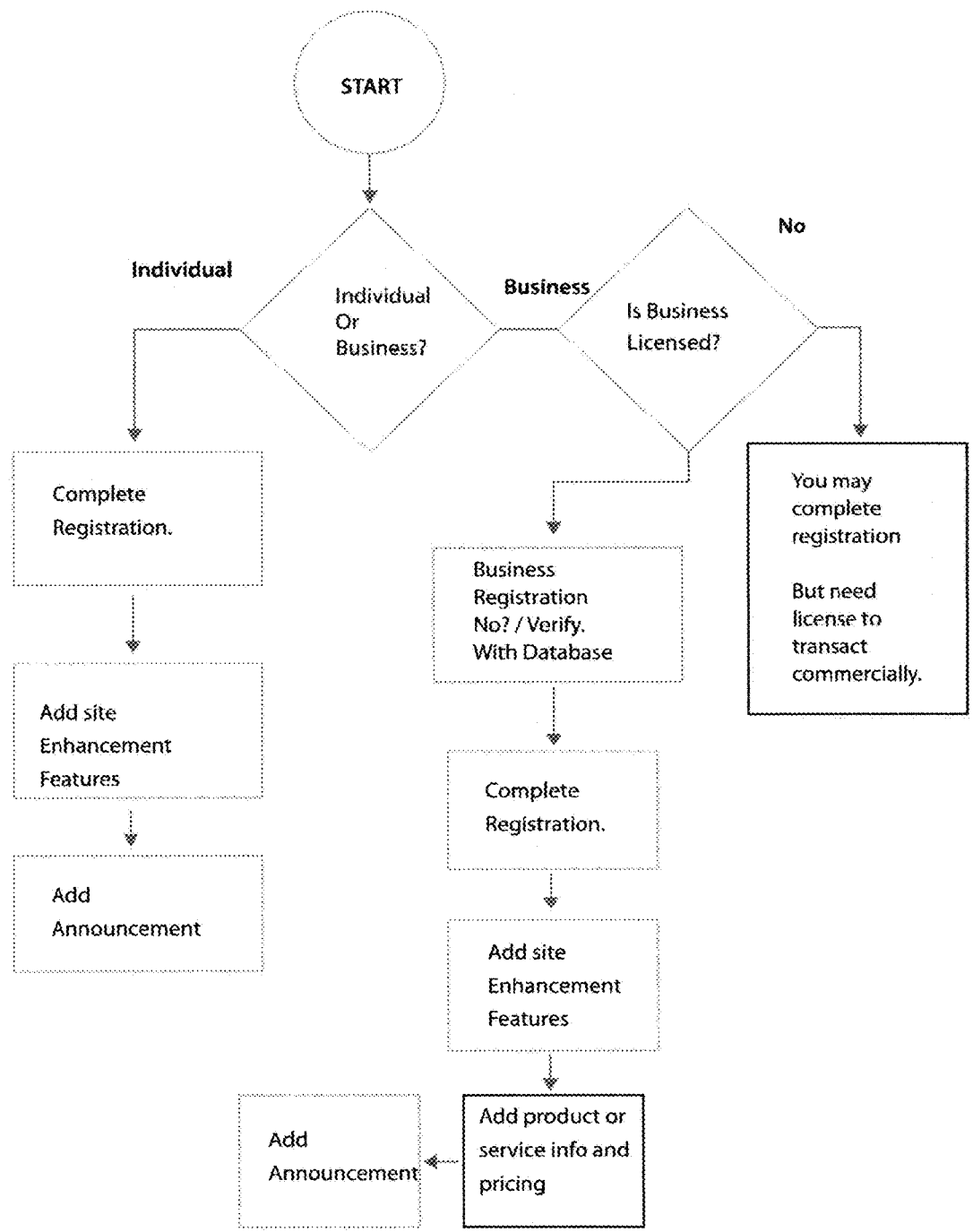
FIG. 3 illustrates the system Interaction Dataflow.

FIG. 3 depicts the flow chart of the person creating the graphic presence. The first step is registration. In addition to the usual registration, the city and postal zone of individuals and the complete postal address of businesses is captured. In the case of individuals, interests are captured as well. In the case of business registration, business license details are captured as well to ensure that the business is a bona fide business. This is cross checked against business database provided by the local government. The user then creates an appropriate representation of his home or business using the graphic tools provided. Commercial transactions are permitted only if the business license is successfully verified. The user then adds the interest enhancement features.

Then the user enters the 'What I Am Looking For' and 'What I Have To Offer' information if there is a need. In the case of businesses, the entries are made to 'What We Are Looking For' and 'What We Are Offering' boxes.

Then the user enters the business specific information like Menu in easy to upload PDF form. This is converted automatically or manually to a form that can be used by customers to fill while placing an order. The individual user enters credit card information either stored within his registration data or entered on the fly. The business enters both credit card as well payment collection details in the payment gateway provided.

The individual user as well as the business user upload the site enhancement tools as per their needs.

Both the individual as well as the business now link their graphic presence to their existing social media presence using the tools provided by our software. With this both the individual user as well as the businesses are ready to start accepting visitors.

I claim:

1. A method for creating a virtual neighborhood comprising:
  registering, by a first user, to a social networking website, wherein the first user indicates their address and postal code and whether they are an individual or business,
  displaying, by the social networking website, an architectural menu containing architectural elements of the exterior of a building wherein:
    the architectural menu displays the architectural elements per category;
    the architectural menu provides multiple choices of elements per category of different colors and designs; and
    each design of an architectural element includes a selection mechanism for selecting one of the multiple choices of designs;
  selecting, by the first user, an architectural element from the architectural menu for each category using the associated selection mechanism;
  displaying, by the social networking website, an enhancement menu allowing selection of multimedia items, including music, videos and images;
  selecting, by the first user, one or more multimedia items from the enhancement menu;
  displaying, by the social networking website, an announcement text box allowing input of announcements;
  inputting, by the first user, an announcement in the announcement text box;
  storing, by the social networking website, the address, postal code, architectural menu selection, enhancement menu selection, and the announcement text box input into a profile of the first user;
  linking, by the social networking website, the first user's profile to a mapping software by including a selectable link on the first user's profile page,
  in response to a second user selecting the selectable link on the first user's profile page, displaying, by the mapping software, a first virtual building that is displayed according to the address, postal code, architectural menu selection, enhancement menu selection, and the announcement text box input,
  in response to a zoom input of a second user, zooming out, by the mapping software, wherein other virtual buildings are displayed located based on their address and postal code and have been customized by other users of the social networking website.

* * * * *